United States Patent [19]
Czyzewski

[11] Patent Number: 4,789,341
[45] Date of Patent: Dec. 6, 1988

[54] MOUNTING FISH HEADS USING THE NATURAL SKIN AND JAWS

[76] Inventor: Donald Czyzewski, 5024 W. 24th Pl., Cicero, Ill. 60650

[21] Appl. No.: 20,573

[22] Filed: Feb. 2, 1987

[51] Int. Cl.$^4$ ............................................. G09B 23/00
[52] U.S. Cl. ................................................... 434/296
[58] Field of Search .................. 434/296, 295; 8/94.12

[56] References Cited
U.S. PATENT DOCUMENTS

| | | | |
|---|---|---|---|
| 2,169,811 | 8/1939 | Navison | 434/296 |
| 3,526,473 | 9/1970 | Burgett et al. | 8/94.12 |
| 3,649,294 | 3/1972 | Thijssen | 426/417 |
| 4,707,369 | 11/1987 | Suresky | 426/417 |

OTHER PUBLICATIONS

Smithsonian Institution, Brief Directions for Taxidermy Procedures and Animal Preparation, pp. 9 and 10.

Primary Examiner—Richard J. Apley
Assistant Examiner—J. Welsh
Attorney, Agent, or Firm—Eugene F. Friedman

[57] ABSTRACT

A process for treating salmonid fish heads and skins utilizing an opening starting from a point generally near the fish's nose and ending at a point near the rear of the head. The opening facilitates access to the total underside of the headskin and the skull. It also permits the removal of the former from the latter. Placing the oil-containing skin in a solution of acetone, isopropyl alcohol, and water removes the oil and permits further use of the skin. The skull and skin can be reused as an undamaged, finished, mounted specimen, either alone or in combination with the other body parts of the fish.

23 Claims, 1 Drawing Sheet

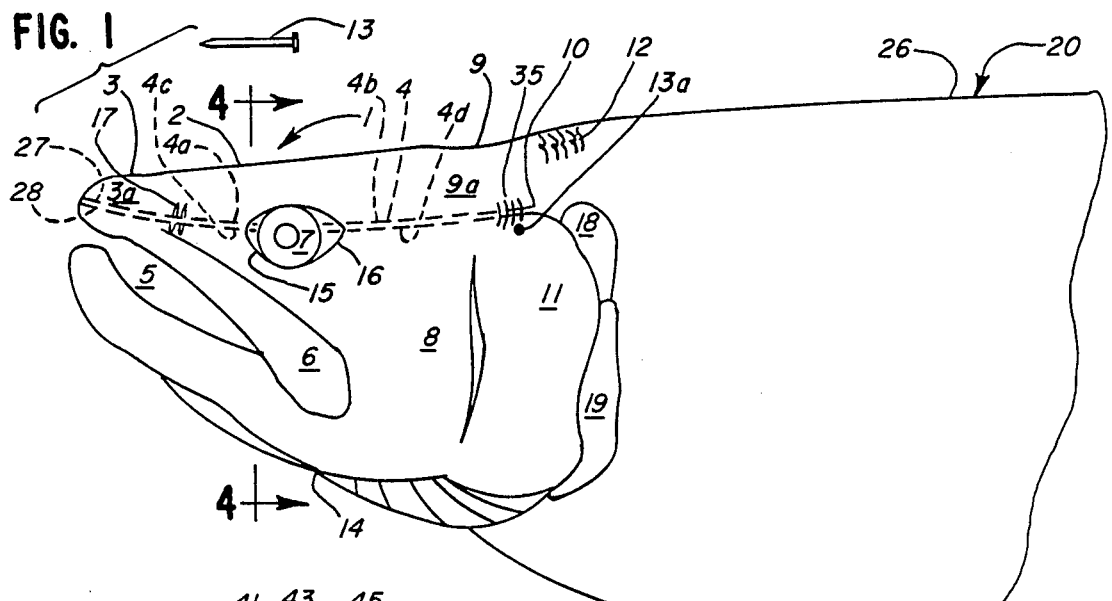
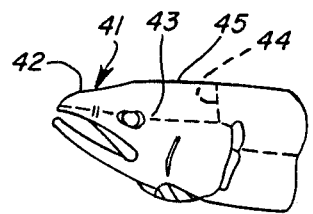
FIG. 2 PRIOR ART
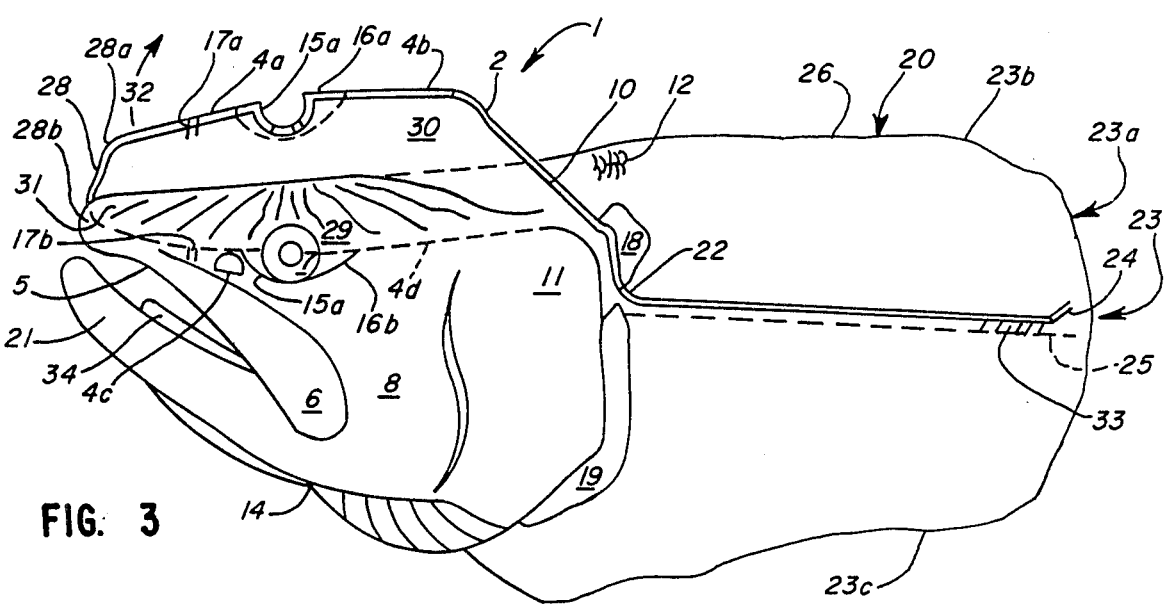
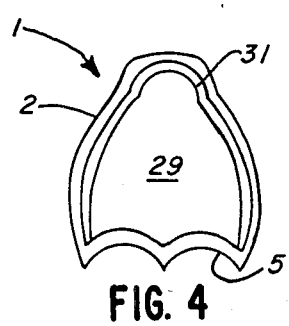
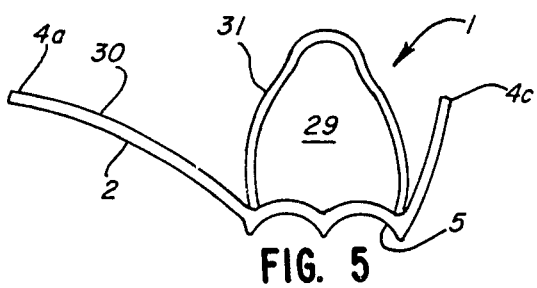

MOUNTING FISH HEADS USING THE NATURAL SKIN AND JAWS

BACKGROUND

The present invention relates to a process for treating a fish head with minimal damage to the headskin. It has particular relevance to salmonid fish. The process displays particular importance in the art of taxidermy.

When mounting a fish, the practitioner desires to construct a mount that imparts a lasting impression of reality. Generally, taxidermy accomplishes this objective through the use of naturally connected or unbroken skin parts of the fish. With dry, or oil free, fish, such as the largemouth bass, this reality through the use of the unbroken skin parts is easily accomplished. However with oily fish such as the salmonid, which includes salmon, trout, and other oily skinned specimens, prior practice has removed either the skull or, more recently, cut off and disposed of about the top one third of these fish skulls with the skin attached.

This method did serve to remove the oily and fatty substances of the skull and headskin as well as the relatively soft skull cartilage of the salmonid fish. However, it created the new problem of a void that had to be filled in order to complete the mounting of the fish.

The void that results from removing the entire or a portion of the skull receives a filling of various materials such as plastic epoxies, paper mache, and various other fillers molded to simulate the head shape. These materials, formulated for other purposes, do not readily bond to natural animal skin. The adhesion problem is exacerbated by the fact that these filler materials do not expand or contract at the same rate as the natural fish skin. As a result, the filler material often separates from the natural skin. The relative movement of the skin and filler results from varying temperature and humidity conditions. Any residual oils that remain in the skin at the margin of the incisions made to achieve access to the fish head will compound the separation from the modeled head.

In general, the separation of the skin from the head proves quite unsightly to the viewer of such specimens. Further, the separation often lifts and cracks the paint or other colorants used to finish the head. As a result, a general feeling exists in the taxidermy profession that the heads of such specimens, so treated, may last about two years before any such separation occurs.

A further difficulty occurs in trying to blend the filler material at a juncture with the back skin of the fish. Additionally, matching the oddly colored fillers to the natural skin of the fish when finishing the specimen also poses a major hurdle.

Moreover, fillers require appreciable time to model and harden properly. This results in additional time and expense to complete the mount.

Removing a portion or all of a fish skull, especially when accompanied by the disposal of a portion or all of the headskin, causes the loss of control when placing the remaining head onto an artificial manikin. The tension provided by the large skin area becomes lost upon disposing of that very skin. As a consequence, the taxidermist must wire and pin parts into place with a profusion of such aids.

Further, disposing of the fish headskin eliminates the natural markings of the specimen. The restoration of the marking never equals the original.

Another method of mounting the salmonid or other oily fish leaves the skull and headskin as is with no treatment other than a preservative soaking or oil removal soaking. Simply soaking the head proves effective neither in preserving nor in removing the oil. Neither step can be effectively accomplished from the outside of the fish's head. The soaking must occur on the skull area or on the underside of the skin itself, or both. With salmonid fish in particular, a large amount of oil lies under the skin and cannot be removed by an external soaking.

Further, an external soaking causes the skin and the underlying flesh to shrink away and the oils to bleed out or shift around under the skull skin. The head, upon drying, will show caved-in areas of the skull. A clearly unnatural appearance of the finished mount results.

In another method of treating, the fish head, after a presoak, undergoes freezedrying. This technique claims that it stops the bleedout, or perculation, of oil through the skull or headskin of the fish head. However, it does not prevent the caving in of the treated head during the drying process.

The primary problem with oily fishes relates, of course, to the large amounts of oils contained in the skin. If not removed from the skin, the oil will perculate through the skin to the exterior. This precludes the paints or other coolants from properly bonding with the skin and causes the emission of oil odors. Further, the oil proves extremely penetrating and can perculate through flesh and dried bone. It will soften these materials, render preservatives less effective, and permit the invasion of insects into the finished mount.

The treating of fish heads for taxidermy purposes can make advantageous use of a workable method of accessing fish heads that is not so radical or as destructive of the desirable parts of the heads. The headskin of the specimens should remain in as undamaged condition as practical while providing access to the oils and other undesirable natural materials for their effective treatment or removal.

SUMMARY

Removing the oil of the headskin of a fish, especially a salmonid fish, will permit the use of that skin in the final mounted product. The oil removal first necessitates removing the actual headskin from the skull of the fish without substantially altering that skull. The preservation of the skull permits the subsequent use of the bones of the skull in the final mounted fish. Furthermore, keeping the skull intact provides the proper tension to the skull for the stretching of the skin when replacing it.

The removal of the skin may well utilize an incision in the skin on one side of the skull. This will allow the show side to remain in an unmarred condition. A convenient incision runs from the nose, through the eye, and to the terminate joint of the gill flap to the headskin.

The removed headskin must then undergo placement in a solution that will have the capability of dissolving and removing the oil in the skin. Generally, a solution that proves miscible both with the oil and with water may well serve that purpose. Such a solution may have acetone as the solvent and may include water and alcohol as solutes.

Lastly, after the removal of the oil, the headskin may then be replaced upon the substantially unaltered skull. The usual treatment steps subsequent to the replacement will provide the final, pleasing product.

BRIEF DESCRIPTION OF THE FIGURES

FIG. 1 gives a side elevational view of a fish head with an opening permitting access to the fish skull bones.

FIG. 2 shows a fish head with an access opening according to the prior art.

FIG. 3 provides a rear side view of a fish head access opening as shown in FIG. 1 in process and connected to a standard side fish body access opening, also in process.

FIG. 4 gives a cross sectional view along the line 4—4 of the fish head of FIG. 1 taken just in front of the eyes.

FIG. 5 provides a cross sectional view as shown in FIG. 4 with the headskin removed from the skull.

DETAILED DESCRIPTION

Referring to FIG. 1, the taxidermic process on a fish head starts with an analysis of the fish head to determine if the headskin has suffered any damage. In particular, the observation generally includes the total skin area of the head 1, including the inside of the mouth 5, and should locate such damage as missing skin, abraded areas, cuts, tears, or other damage. Only in the absence of appreciable deformation to the headskin 2 should further work on the fish head 1 proceed.

In FIG. 1, the access opening starts at approximately the front point 27 in the area of the nose 3a. It then travels to the rear point 10 which lies at the terminate joint of the gill cover 11 to the headskin 2. This generally occurs in the rear area 9a of the head 1.

The opening 4 actually involves two incisions. The first runs between the point 27 in the frontal area 3a. It includes the upper and lower edges 4a and 4c, respectively, and extends through the eye membrane 15 to terminate at the front of the eye 7. The second incision produces the upper and lower edges 4b and 4d, respectively, and runs from the rear of the eye 7, through the eye membrane 16, and continues to the juncture 10 of the gill flap 11 with the headskin 2 at the rear 9a of the head.

However as seen in FIG. 3, when the headskin 2 is raised from the skull in the direction of the arrow 32, the access opening 4 actually extends the entire distance between the points 10 and 27. It includes (on the upper edge) a portion of the headskin 2 that incorporates the nostril portions 17a, the edge 4a, and the eye membranes 15a and 16a, which, when released from the eye 7, form a connecting portion of skin. The raised skin includes, in its entirety, the edge 4b. All of these portions combine to form the upper edge of the opening 4, which need not form a straight line. A variable configuration of the opening 4 may appear, in fact, in the small turn 28 in FIG. 1 and in the curves 28, 28a and 28b in FIG. 3. The curved portions 28, 28a, and 28b facilitate access to the nose portion 3a in FIG. 1.

FIG. 4 shows the placement of the access opening 4. In particular, the headskin 2 has an unbroken circumference. Only one access opening 4 is needed to break through the headskin 2. The mouthskin 5 forms a portion of the opening. The single access opening 4 in FIG. 5, including the edges 4a and 4c, provides access to the entire head 1. In FIG. 5, access to the entire head 1 is accomplished by the skin removal permitted with the opening 4.

The placement of the access opening 4 includes the mouthskin 5 on the inside of the mouth. This represents an important placement for example, on fish such as eels where no body incision, as drawn in FIG. 1, is made. In this instance, the skinning is accomplished from the inside of the mouth, similar to pulling a stocking off of a foot. Alternately, the skinning proceeds through the access opening 4, as shown in the figures. The mouthskin 5 is generally weaker than the remaing headskin 2.

The access opening 4 is more easily handled when kept primarily in the headskin 2. More precisely, it should remain in an area from the very top of the head 1, between the points 3 and 9, to an area approximately along the incision 4. To go over the top beyond a line between the points 3 and 9 would place the opening 4 on the front, or show, side of the specimen. This would negate many of the positive aspects of the method, which proivdes at least one side of a perfect, uncut, presentation of the original headskin 2.

To make the incision lower than that shown opening 4 would place the opening through the very soft and thin gill pouches which could not be reclosed, for example, by sewing with thread. The sewing would not normally hold well in the soft skin of the pouches 8 when under the tension of closing or drying. A lower placement would also tend to render the hard thin portion of the gill flap 11 unrepairable if cut through. The repairs on any closed opening need to blend into the natural features of the head 1 for the best appearance. The ideal placement for the opening 4 is substantially as shown in the figures.

FIG. 3 shows the headskin 2 partially lifted off the skull 29 in the direction shown by the arrow 32. The opening 4 provides access to the underside 30 of the headskin. The skull 29 then can be cleaned of oil, fat, or flesh primarily at the fatty layer 31 at the surface of the skull 29. Alternately, the opening 4 permits the removal of the entire headskin 2 from the skull 29, enabling the treatment of the headskin 2 with an oil remover or a preservative, such as outlined below. The oils or fats in the headskin 2 are reachable only on the skin surface 30 that adheres to the skull 29 before making the opening 4.

Referring to FIGS. 1 and 3, a thin bladed, serrated edge can be worked under the upper edge 4a and 4b of the opening 4 for further access to the skin surface 30 and the skull 29. In FIG. 3, the incision 23 facilitates the removal of the body skin 26 from the flesh of the body 33. A Diem fish knife, with a similar but thicker blade, may also find use. The Diem knife, however, has generally proven too cumbersome for work on the heads of most fish and often cuts or otherwise damages the headskin 2.

A good tool for obtaining access to the headskin 2 is a thin metal, serrated edge, commonly referred to as an orange peeler. This tool removes the rind of an orange and has proven safe for making the opening 4 and in separating the headskin 2 from the skull 29. Holding the serrated edge at an angle and down tightly to the skull 29 facilitates the removal of the headskin 2, especially if a slight sawing movement is used while the knife is held tightly to the skull 29. The headskin 2 is not removed from the skull 29 as easily as the bodyskin 26 is lifted from the body flesh 33. Accordingly, more care should be used while accessing the head 1.

The headskin 2 is separated from the skull 29 and lifted until freed to a point on the opposite side of the fish, where the two attachments of the gill flaps 11 to the skull 29 are located. A bony or gristle substance forms the connections near the point 10 on each side of the head 1. Both connections should be severed underneath the gill flap 11. Severing these attachments will drop the lower edge 4c and 4d of the opening 4 down, allowing its separation from the skull 29 along the lines 4c, 15a, 16b, and 4d. This opens the total circumference of the headskin 2 and the mouthskin 5, permitting their removal without further damage than the opening 4 itself. The removal of the lower headskin can be accomplished with the use of a sharp scalpel, tin snips, or an orange peeler. FIG. 5 shows the headskin 2 about two-thirds separated from the fatty, fleshy layer 31 and the skull 29. In FIG. 5, the mouthskin 5 must still be removed.

In FIG. 3, the point of attachment 14 of the body 20 to the head 1 at the underside of the jaw 21 is also the point of attachment of the gills to the tongue 34. Before undertaking the final skinning of the head, the gills should be removed by cutting through their attachment to the roof of the mouth and severing their connection to the back of the tongue at the throat 14. The throat attachment 14 itself should be severed as well. This will enable the whole skin area 2 to open away from the skull 29.

For mounting the fish's natural gills, the top gill connection should be severed and the throat 14 should be severed. However, the gills should remain attached to the tongue and the tongue attached to the jaw 21. The throat 14 will drop down from the head 1, and the gills will collapse away from the skull 29 while remaining attached to the tongue 34. The tongue 34, in turn, remains affixed to the jaw 21. Further gill work, for example the severing of the thin membrane which lays just along the head side of the bony plates 18 and 19 or their treatment or replacement with either natural or artificial items, may be undertaken at this point.

Once the headskin 2 is removed, it may then be treated with preservatives and oil removal chemicals as needed. A light fleshing down of the inside surface of the headskin 30 can be accomplished at this time; care should be taken to not slice or tear through it. This smoothing out of the underside 30 of the headskin 2 can be accomplished with the use of a file or a sharp blade and will lead to a smoother appearance when the headskin is replaced over either the skull or an artificial mannequin.

The procedure in the preceding paragraph only makes use of the head 1 without any attachment of the body skin 26. As shown in FIGS. 1 and 3, various openings, such as the incision 23, may be used with the acess opening 4 as in FIG. 3. The reason for an incision is basically to prevent any loss or damage to the fish's scales 12, which cover almost the entire body skin 26 of salmonid fishes.

The side body incision 23, when adjoined to the access opening 4, will allow for the total skin removal of scaled salmonid or similar fishes. The body incision 23 can be placed almost anywhere on the specimen's body 20 and connect to the access opening 4. This will provide for the total removal of the skin 2 and 26 with an incision along the side 23, the back 23b, or the belly 23c. Any such routes should adjoin at the juncture 22 of the bony plates 18 and 19 or at the location of the throat joint 14 and the membranes along the side of the bony plates 18 and 19. Other cuts or separations of the skin 20 from the body 26 of the skull 29 will automatically form this connection. This will provide for the use of the whole skin 2 and 26 of the fish, particularly salmonid fishes, for taxidermy or other uses.

Of interest would be an incision along the upper body 23a. If utilized, the route could connect with the opening 4, at one end, and run to the specimens's tail at the other end. This forms an almost straight cut from nose to tail, including the head opening 4 and the body incision 23a.

As discussed above, some aquatic animals will not require a body incision to permit the removal of this skin. The head opening 4 will suffice. This is particularly so since eels and similar fish do not have scales that will be lost or damaged by the "unpeeling" of the skin.

After removal, the skin must undergo treatment prior to its reattachment to the skull. The first step in this process involves the removal of oil within the skin. A solution including a gallon of acetone, one cup of isopropyl alcohol, and one quarter cup of distilled water serves to accomplish the objective.

The acetone, naturally, serves the basic oil removal function. The alcohol apparently helps preclude the skin from aging or disintegrating as would happen with pure acetone. Furthermore, the skin itself may contain some water. As this water leaches into the solution, it appears to carry with it some of the oil. The miscibility of the different constituent into the solution help remove all of the entrapped liquids from the skin. The removal of the oil may, in fact, take several soakings in the solution.

After the oil removal, the skin enters a saturated solution of baking soda and water. This apparently helps remove any free oils remaining in the skin after the prior step.

The skin then goes into a balancing and tanning solution composed of one gallon of water with one cup of white vinegar. This solution places the skin in a condition in which it will accept the usual white glue in its subsequent replacement upon the skull. Further, after this treatment, any oil remaining in the skin will have a tendency to depart during the drying process.

An emersion in a soap solution having a cup of "Spick 'n Span" soap in a gallon of water follows. This serves to remove surface films of oil and debris while providing a slight perfuming to the skin. A clear water rinse then serves to wash the soap from the skin.

The skin next soaks in a solution containing a gallon of water with one half cup of 37 percent solution of formaldehyde. The formaldehyde, of course, acts as a general preservative to the skin. Additionally, after the removal of the skin from the solution, the application of the 37 percent formaldehyde solution itself with an eyedropper should be made to the head and skin areas which may attract insects.

Referring to FIG. 1, after cleaning, removing oil, preserving, and any other desired work, the total skin 2 and 26 can be either placed back onto a molded and prepared skull or an artificial mannequin. When the skin 2 is replaced and closed, it should look very much like the original fish as in FIG. 1 when the process to provide access to the fish head started, depending upon the skull of the individual taxidermist. In a natural replacement, smoothing the skin during the fleshing is aided by adding a thin layer of putty, paper mache, or other filling to the prepared headform or skull. This will tend to eliminate irregularities, as will, to some extent, a good glue.

A preferred mache formula to either model an entire head or to fill portions of the fish's skull utilizes one cup of dry, good, pulverized paper mache base. A suitable adhesive for this mache takes the form of "Elmer's Concrete Bonder" sold by the Borden, Inc., Columbus, Ohio 43215, under the number E-863. This concrete bonder has a high tolerance to salts and to sodium bicarbonate. Additionally, the mache formula may include one-half teaspoon of the 37 percent formaldehyde for the usual preservative purposes. Lastly, the mache should have sufficient water to provide it with the desired consistency.

The glues used on the headskin 2 should have a thick consistency for better adhesion of the headskin 30 in FIG. 3 to the mannequin or the skull 29. This thickness will minimize or even eliminate the possible runoff before the fillers set and the headskin 2 dries. Regular white glue on the body skin 26 will tend to run. However, a good thick, white hobby glue may serve well. Or, present taxidermy glues now in use for fish can possibly find use if thickened by some means for use on the head 1 of a fish mount.

FIG. 1 also shows different methods for closing the access opening 4. First, the ringed nail 13 is usually used to hang wall paneling in the construction trade. An appropriately sized nail 13 may be driven through the gill cover 11 at the location 13a and into the prepared base 29 in FIG. 3.

Additionally, the stitching 35 will form a tight meeting of the upper edge portions 4a and 4b of the access opening 4 to the lower edge 4c and 4d, respectively. The stitching should then also effect the closure of the incision 28. The stitching 35 may possibly except the immediate eye socket space 7. The nail 13 and the stitching 35, when used, may constitute a permanent part of the process, remaining even through finishing and subsequent display. The ringed or barbed nail 13 has a design that possesses superior holding power in many types of materials and provides an excellent closure. It also retains the weight of the gill flap 11 which aids the stitching 35 in accuracy and overall strength.

After closing the entire opening 4 with the nail 13 or stitching 35 or both, any irregularities can be improved with the usual techniques. Some examples of such work might include compensational filling, puttying, pinning, wiring, or other normal procedures involved in the finishing of a fish specimen prior to drying.

The whole fish head must, of course, dry. Air drying with fans or freezedrying after the various glues and other substances set will accomplish this task.

At this point, the fish head, where appropriate, may receive a glass eye. Additionally, any minor repairs required because of the incision may be undertaken at this point.

The dried whole fish head now should receive a finishing of Tru Oil Gunstock Finish. The Birchwood Casey Company of Eden Prarie, Minn., manufactures this product under the catalogue number T022 231023. This Tru Oil does not seem to suffer deleteriously from any traces of fish oil that may remain after the prior treatment.

After the finish of the prior step completely dries, the fish may receive one or more layers of paint. This paint may take the form of a mixture of one drop of an acrylic additive sold under the Ditzler brand, DX1798, in one-fourth to one-half cup of an acrylic lacquer. Both the lacquer and the additive emanate from Ditzler Automotive Finishes, PPG Industries, Inc., Detroilt, Mich. 48235.

Referring to FIG. 2, taxidermists previously made identical incisions 43 on both sides of the fish head 41. They then cut the additional access opening 44 across the back which connects the two side incisions 44 and 45, forming an area within the boundary defined by the openings 43, 44, and 45. The prior technique then cut off and disposed of the entire top of the head and the attached skin above the eyes. The eliminated portions included the portion of the head 41 and the headskin 42 within the area defined by the openings 43, 44, and 45; no further use was made of these parts. The resultant void was filled just prior to finishing but after the head was filled and dried.

As another previously used method, taxidermists removed the entire head 1 on a line running approximately through the front perimeter of the scales 12, down through either the front or rear edge of the bony plates 18, 19, and around to the throat area 14. The taxidermists then modeled and recreated the entire head 1 or a portion of it with putties, epoxies, or other artificial reconstructive aids. The skin connection remained a weak link in the system for the previously discussed reasons of adhesion. Further, the artificial surface lacks compatability with natural skin, especially during the expansion and contraction of the finished specimen as a whole unit.

The specimen in FIG. 1 constitutes a dramatic improvement over prior art including that shown in FIG. 2. The present specimen, as illustrated in FIG. 1 and described, will retain the natural features on at least the show side of a fish head. Such features will remain in excellent condition in displaying the head itself or an entire specimen including the head.

Accordingly, what is claimed is:

1. A method of mounting a fish head comprising:
   (A) removing the headskin from the skull of said fish without substantially altering the structure of said skull;
   (B) placing the removed headskin in a solution composed of a solute dissolved in a solvent that will dissolve and remove the oil in said skin; and
   (C) replacing the headskin from which said oil has been removed upon said substantially unaltered skull.

2. The method of claim 1 wherein the step of removing said headskin from said skull includes making a cut in said skin on one side of the head and passing approximately from the nose of said fish, through the eye of said fish, and to the terminate joint of the gill cover to the headskin of said fish.

3. The method of claim 2 wherein said solution is miscible both with the oil in said skin and with water.

4. The method of claim 3 wherein said fish is a salmonid fish.

5. The method of claim 4 wherein the solvent in said solution is acetone.

6. The method of claim 5 wherein said solution is a first solution and said method further includes, after placing said headskin in said first solution, placing said headskin in a second solution which comprises water as a solvent and is substantially saturated with sodium bicarbonate as a solute.

7. The method of claim 6 wherein said first solution includes an alcohol and water as solutes.

8. The method of claim 7 wherein the step of placing said headskin in said first solution includes placing said headskin in a first portion of said first solution, removing said headskin from said first portion of said first solution, and then placing said headskin in a second portion of said first solution with said second portion being substantially free of fish oil.

9. A method of treating the headskin of a fish for preservation, with said headskin including fish oil, said method comprising:

(A) soaking a section of a removed headskin in a liquid miscible with said oil and with water;
(B) afterwards soaking said skin in an aqueous solution; and
(C) afterwards drying said skin.

10. The method of claim 9 wherein said liquid is a solution having acetone as the solvent.

11. The method of claim 10 wherein said fish is a salmonid fish.

12. The method of claim 11 wherein said solution is a first solution and said method further includes, after placing said headskin in said first solution, placing said headskin in a second solution which comprises water as a solvent and is substantially saturated with sodium bicarbonate as a solute.

13. The method of claim 12 wherein said first solution includes an alcohol and water of solutes.

14. The method of claim 13 wherein the step of placing said headskin in said first solution includes placing said headskin in a first portion of said first solution, removing said headskin from said first portion of said first solution, and then placing said headskin in a second portion of said first solution with said second portion being substantially free of fish oil.

15. A method of mounting a head of a salmonid fish comprising:

(A) removing the headskin from the skull of said fish;
(B) placing the removed headskin in a solution composed of a solute dissolved in a solvent that will dissolve and remove the oil in said skin;
(C) placing the headskin from which said oil has been removed upon a rigid structure having substantially the same form as said skull.

16. The method of claim 15 wherein said form is said skull.

17. The method of claim 15 wherein said form is composed of material not forming said skull.

18. The method of claim 17 wherein said step of removing said headskin from said skull includes making a cut in said skin on one side of the head and passing approximately from the nose of said fish, through the eye of said fish, and to the terminate joint of the gill cover to the headskin of said fish.

19. The method of claim 18 wherein said solution is miscible both with the oil in said skin and with water.

20. The method of claim 19 wherein the solvent in said solution is acetone.

21. The method of claim 20 wherein said solution is a first solution and said method further includes, after placing said headskin in said first solution, placing said headskin in a second solution which comprises water as a solvent and is substantially saturated with sodium bicarbonate as a solute.

22. The method of claim 21 wherein said first solution includes an alcohol and water as solutes.

23. The method of claim 22 wherein the step of placing said headskin in said first solution includes placing said headskin in a first portion of said first solution, removing said headskin from said first portion of said first solution, and then placing said headskin in a second portion of said first solution with said second portion being substantially free of fish oil.

* * * * *